United States Patent [19]

Beyers et al.

[11] 4,059,313

[45] Nov. 22, 1977

[54] TRACK BELT ASSEMBLY

[75] Inventors: Marvin E. Beyers; Floyd S. Dadds, both of Peoria, Ill.

[73] Assignee: Caterpillar Tractor Co., Peoria, Ill.

[21] Appl. No.: 727,189

[22] Filed: Sept. 27, 1976

[51] Int. Cl.² .......................................... B62D 55/28
[52] U.S. Cl. ........................................ 305/19; 305/54
[58] Field of Search ............ 305/19, 54, 35 EB, 38; 85/4, 35; 151/68; 52/617, 410, 309.2; 152/175, 176

[56] References Cited

U.S. PATENT DOCUMENTS 3,434,521   3/1969   Flora .................................. 85/35 X
3,773,394  11/1973   Grawey ............................ 305/19 X
3,899,220   8/1975   Grawey et al. ...................... 305/19

Primary Examiner—Robert B. Reeves
Assistant Examiner—John P. Shannon
Attorney, Agent, or Firm—Charles E. Lanchantin, Jr.

[57] ABSTRACT

A track belt assembly is disclosed which includes an elastomeric belt, a shoe externally mounted on the belt, a keeper member internally mounted on the belt, a threaded bolt, and a removable retaining device which is interlockingly associated with the keeper member for screw threadably receiving the bolt therein and allowing the shoe and keeper member to be drawn clampingly together and tightly to the belt.

5 Claims, 3 Drawing Figures

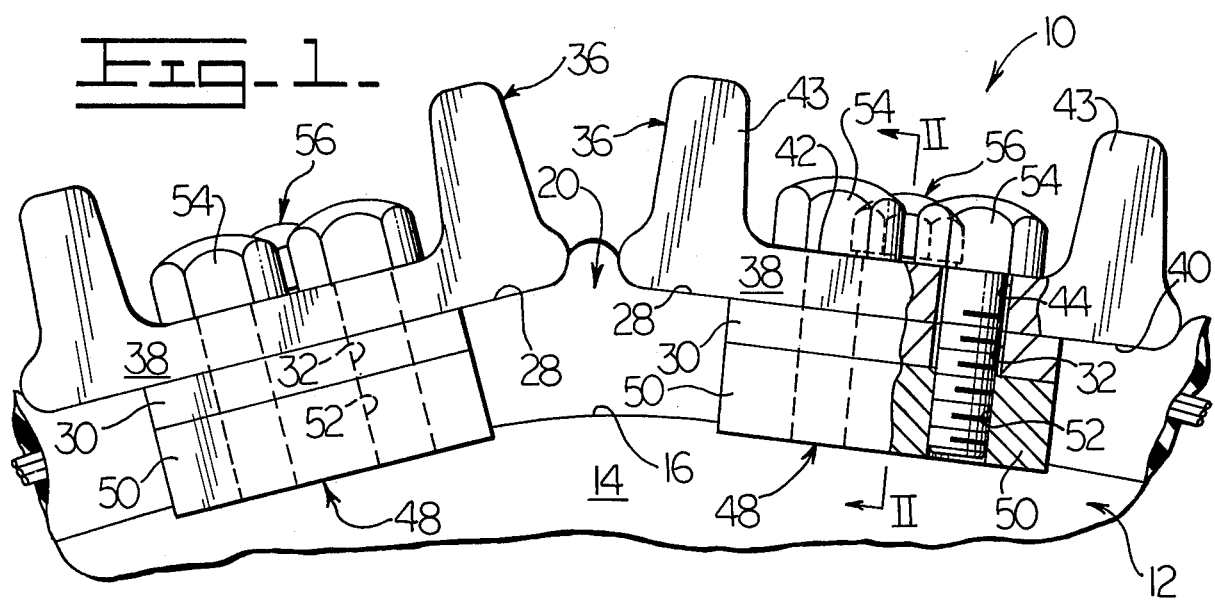

TRACK BELT ASSEMBLY

BACKGROUND OF THE INVENTION

Replaceable track belt assemblies of the type including an endless flexible belt with a plurality of track shoes mounted peripherally thereon are currently being used by the industry on pneumatic tires as is disclosed in U.S. Pat. No. 3,773,394 issued Nov. 20, 1973 to C. E. Grawey and U.S. Pat. No. 3,899,220 issued Aug. 12, 1975 to C. E. Grawey, et al, and which are assigned to the assignee of the present invention.

In these assemblies the shoes which are mounted on the belt are secured thereto by a plurality of bolts which are screw threadably received in metal keeper bars which are captive in the elastomeric belt. Thus, while these track belt assemblies provide increased traction for the vehicle, and improved flotation and protection of the pneumatic tire on which they are mounted, the heavy loads on the shoes impose large forces thereon and on the retaining bolts.

Because of the heavy loads on the shoes and retaining bolts, the internal threads will occasionally strip out of the keeper bars and field repair thereof has been found to be difficult. Accordingly, the anchoring of the shoes to the keeper bars was modified to eliminate threaded holes therein, and separately replaceable retaining blocks utilized at the lateral end of the shoes with threaded bores therein. With this arrangement, each keeper bar had plain bores or clearance holes at the lateral ends thereof and was entrapped between the shoe and the retaining block by the bolts passing therethrough so as to securely anchor the shoes to the belt.

While the last mentioned anchoring system has proven extremely effective in securing the lateral ends of the shoes to the retaining blocks overlyingly adjacent the sidewalls of the tire, it lacks rigid mounting of the shoes centrally therebetween. Moreover, with the advent of higher forces through the track belt assembly, larger vehicle tires, and greater shoe widths, there is an increased need for greater anchoring rigidity of the shoe across the full width thereof.

SUMMARY AND OBJECTS OF THE INVENTION

Accordingly, it is an object of the present invention to provide an improved track belt assembly which can more securely anchor one of the individual shoes thereof to the belt.

Another object of the invention is to provide such a track belt assembly which will enable better central attachment of the shoe to the belt for increased strength and rigidity across the width thereof.

Another object is to provide a strong track belt assembly of the character described which will exhibit increased serviceability such as by eliminating the need for threaded bores in the keeper members thereof and which keeper members are captively mounted to the belt.

Other objects and advantages of the present invention will become more readily apparent upon reference to the accompanying drawings and the following description.

BRIEF DESCRIPTION OF THE DRAWINGS

FIG. 1 is a fragmentary side elevational view of the track belt assembly of the present invention showing two adjacent track shoes, and with a portion broken open to better illustrate details of construction of the fastening devices at the lateral ends thereof.

FIG. 2 is a fragmentary transverse cross sectional view of the track belt assembly of the present invention as taken along the line II—II of FIG. 1.

FIG. 3 is an enlarged fragmentary sectional view of the central portion of FIG. 2 showing details of construction of the removable fastening device thereat.

DESCRIPTION OF THE PREFERRED EMBODIMENT

Referring to FIGS. 1 and 2, an arcuate portion of the track belt assembly 10 of the present invention is shown as being mounted on a pneumatic tire or elastomeric supporting carcass 12. This carcass has a pair of opposite sidewalls 14 and a relatively flat peripheral surface 16 therebetween with a plurality of annular grooves 18 therein for more securely mounting the track belt assembly thereto.

As is apparent from the drawing, the track belt assembly includes the cylindrical elastomeric mounting belt 20 with a plurality of inner circumferential lands or ribs 22 defined thereon which individually interlock within the anular grooves 18 in the carcass 12. Preferably, the mounting belt has a plurality of circumferentially wound wire reinforcing elements 24 therein as shown best in FIG. 3 and which extend laterally across the full width of the belt to a pair of opposite end walls 26. As shown in FIG. 1, the mounting belt preferably also is formed with a plurality of flat shoe sites or surfaces 28 at equally spaced distances around the periphery of the belt.

In the particular track belt assembly illustrated, a plurality of elongated metal keeper members or anchoring plates 30 are captively mounted internally of the mounting belt 20 across the full width thereof and are individually disposed in radial alignment with each one of the shoe sites 28. A pair of laterally aligned bolt openings 32 are formed through each keeper member at the opposite ends thereof and outwardly of the tire sidewalls 14, and in the instant example a single centrally disposed opening or polygonally profiled aperture 34 is also formed therethrough.

Pursuant to the present invention, a metal track shoe 36 is mounted on each one of the shoe sites 28 and thus a plurality thereof are spaced equidistantly around the periphery of the mounting belt 20. Each of the shoes has a flat base portion 38 defining a flat underside 40 and a flat exterior surface 42, and a pair of upstanding grousers 43 integral therewith. As shown best on FIGS. 1 and 3, respectively, a pair of circumferentially aligned bolt openings 44 are formed between these flat surfaces at the ends thereof while another bolt opening 46 is formed therethrough centrally thereof.

In the instant example, provision is made to securely anchor the track shoes 36 to the keeper members 30 by a removable fastening device 48 disposed at the opposite ends thereof. Each of these end devices includes a retaining block 50 with a pair of threaded bores 52 therein which are adapted to receive a pair of threaded dome hex-head bolts 54. These bolts extend through the aligned openings 32 and 44 in the keeper member and track shoe, respectively, so that when they are threadably engaged with the retaining block the track shoe 36 is securely anchored to the mounting belt 20.

In accordance with the present invention there is provided an improved removable fastening device 56 centrally at each one of the track shoes 36. Referring now to FIG. 3, each of these central fastening devices may be seen to include an internally threaded retaining and spacing element 58 and a cooperating threaded bolt 60 which are respectively received in a pair of openings 62 and 64 provided in the belt 20, the profiled aperture 34 in the retaining member 30, and the central opening 46 in the track shoe. More specifically, the retaining element includes a threaded bore 66 internally thereof and three geometric portions externally thereof, namely an enlarged base or overlapping flange portion 68, a central hexagonal locking portion 70, and a cylindrical spacing portion 72 which define a shoulder 74 and an end surface 76.

Thus, in operation, the retaining element 58 of the central fastening device 56 is radially inserted through the openings 64 and 62 of the mounting belt 20 and into interlocking engagement with the polygonally profiled aperture 34 in the keeper member 30. It is to be appreciated, of course, that the retaining element is installed in this manner prior to mounting of the belt on the tire 12. After it is mounted on the tire, however, the individual track shoes 36 may be seated on the surfaces 28 and the central bolts 60 inserted radially inwardly through the openings 46 thereof where they are received by the retaining elements. Screw threaded engagement of the bolts 60 in the bores 66 will draw the face portion 38 of each track shoe toward their respective keeper members. Advantageously, the hexagonal locking portion 70 of the retaining element 58 is prevented from rotating by its close coupling within the correspondingly profiled aperture. And, in accordance with another aspect of the invention, a predetermined compressive loading of the mounting belt is provided by the predetermined radial spacing between the shoulder 74 and the end surface 76 of the retaining element since the shoulder makes load bearing engagement radially outwardly against the keeper member and the end surface abuts the underside 40 of the shoe.

In the event that the threaded bore 66 is inadvertently stripped by the bolt 60, it is clearly apparent that the retaining element 58 may be removed radially inwardly from its entrapped disposition with the belt upon removing the belt from the tire 12. This is readily accomplished after releasing air from the tire in a conventional manner.

Thus, it may be appreciated that the track belt assembly of the present invention and including the removable fastening device 56 assures a more rigid and serviceable mounting system for anchoring the individual track shoes to the belt centrally thereof. Not only is increased strength and rigidity obtained across the full width thereof, but also the retaining elements 58 thereof may be easily serviced or replaced without affecting the captive keeper member 30. Incidentally, even though the keeper member of the instant embodiment is contained within the elastomeric material of the belt, it may also be disposed on the radially inner circumference thereof. In either case, the keeper member may be considered as being internally mounted on the belt.

While the invention has been described and shown with particular reference to a preferred embodiment, it will be apparent that other variations might be possible, such as use of a plurality of the fastening devices 56 across the width of each shoe, that would fall within the scope of the present invention, which is not intended to be limited except as defined in the following claims.

What is claimed is:

1. A track belt assembly comprising:
   an elastomeric belt having an opening therethrough;
   a shoe having an opening therethrough, said shoe being externally mounted on said belt;
   a keeper member having an aperture therethrough, said keeper being connected to said belt;
   a threaded bolt extending through said opening in said shoe; and
   an internally threaded retaining element removably connected to said keeper member, said retaining element being nonrotatably disposed in said aperture, screw threadably receiving said bolt therein, and allowing said shoe and said keeper member to be drawn clampingly together and tightly to said belt, said retaining element extending through said opening in said belt and maintaining a preselected spacing between said shoe and said keeper member.

2. The track belt assembly of claim 1 wherein said retaining element has a locking portion and a juxtaposed overlapping flange portion, said flange portion making load bearing engagement with said keeper member.

3. The track belt assembly of claim 2 wherein said locking portion is of hexagonal construction.

4. The track belt assembly of claim 1 wherein said retaining element has an overlapping flange portion and an inner end surface spaced a predetermined distance apart for defining said preselected spacing and thereby a predetermined compressive preload of said belt between said shoe and said keeper member.

5. The track belt assembly of claim 2 wherein said aperture of said keeper member and said locking portion of said retaining element are of interlocking polygonal construction.

* * * * *